US005379635A

United States Patent [19]

Gee et al.

[11] Patent Number: 5,379,635

[45] Date of Patent: Jan. 10, 1995

[54] METHOD AND APPARATUS FOR IDENTIFYING CHARACTERISTIC SHIFT DOWNWARD

[75] Inventors: Thomas S. Gee, Canton; Paul F. Smith, Dearborn Heights, both of Mich.

[73] Assignee: Ford Motor Company, Dearborn, Mich.

[21] Appl. No.: 161,029

[22] Filed: Dec. 3, 1993

[51] Int. Cl.[6] .......... G01M 19/00

[52] U.S. Cl. .......... 73/118.1; 123/688

[58] Field of Search .......... 73/118.1, 1 G, 23.32; 123/688; 340/438

[56] References Cited

U.S. PATENT DOCUMENTS

| | | | |
|---|---|---|---|
| 4,177,787 | 12/1979 | Hattori et al. | 123/198 D |
| 4,202,301 | 5/1980 | Early et al. | 123/688 |
| 4,263,652 | 4/1981 | Henrich | 364/431.12 |
| 4,391,251 | 7/1983 | Planteline et al. | 123/687 |
| 4,742,808 | 5/1988 | Blumel et al. | 123/688 |
| 4,750,353 | 6/1988 | Wright et al. | 73/118.1 |
| 4,759,328 | 7/1988 | Blumel et al. | 123/688 |
| 4,817,418 | 4/1989 | Asami et al. | 73/118.1 |
| 4,844,038 | 7/1989 | Yamato et al. | 123/685 |
| 5,052,361 | 10/1991 | Ono et al. | 73/23.32 |
| 5,058,556 | 10/1991 | Fukuma et al. | 123/489 |

FOREIGN PATENT DOCUMENTS

| | | | |
|---|---|---|---|
| 4069567 | 3/1992 | Japan | 73/23.32 |

*Primary Examiner*—Hezron E. Williams
*Assistant Examiner*—James M. Olsen
*Attorney, Agent, or Firm*—Mark S. Sparschu; Roger L. May

[57] ABSTRACT

A system for detecting a fault in an exhaust gas oxygen (EGO) sensor includes generating a first signal with a first voltage if the EGO sensor output signal is approaching an unacceptable voltage and a second voltage if the EGO sensor output signal has an unacceptable voltage. The system further includes setting a first flag if the first signal has the first voltage and a second flag, indicating an EGO sensor fault, if the first signal has the second voltage and the first flag is set.

20 Claims, 3 Drawing Sheets

METHOD AND APPARATUS FOR IDENTIFYING CHARACTERISTIC SHIFT DOWNWARD

BACKGROUND OF THE INVENTION

1. Field of the Invention

The present invention relates to a method and apparatus for detecting a fault in an exhaust gas oxygen sensor.

2. Description of the Related Art

Controlling emissions from automobile engines has for some time been an important focus in the design of automobiles. Emission control is receiving increased attention with upcoming On-Board Diagnostics II (OBD II) emission regulations.

In vehicle emission control systems, important components are exhaust gas oxygen (EGO) sensors. A vehicle may have one or more EGO sensors. These sensors measure the amount of oxygen in a vehicle's exhaust. The outputs of these sensors are typically fed back to an electronic engine controller. The electronic engine controller in turn controls a number of engine parameters to attempt to keep the engine running at a desired intake air-fuel ratio. Successful maintenance of the desired intake air-fuel ratio helps reduce undesirable emissions from the engine.

In normal operation, a typical EGO sensor generates an output signal which transitions between two voltage levels. One voltage level is generated when there is excess oxygen in the vehicle exhaust, an indicator that the engine is running at a lean air-fuel ratio. The other voltage level is generated by the EGO sensor when there is a lack of oxygen in the vehicle exhaust, an indicator that the engine is running at a rich air-fuel ratio. In normal engine operation, the output of an EGO sensor will frequently switch between the two voltage levels, as the electronic engine controller continually strives to maintain the desired intake air-fuel ratio.

Typically, an EGO sensor has a reference electrode located in a port which is open to the atmosphere. This electrode, because it is exposed to the atmosphere, is exposed to a relatively constant and known amount of oxygen. This relatively constant amount of oxygen serves as a reference against which the vehicle exhaust gas is compared. An EGO sensor can thus generate an output signal indicative of the oxygen content of the vehicle exhaust gas.

Because automotive emission control is such an important endeavor and because EGO sensors play such an important part in automotive emission control, diagnosing faults in an EGO sensor output signal is important. Faults in an EGO sensor output signal can have a number of causes and can be manifested by a number of effects on the EGO sensor output signal. For example, the electrical wiring which carries an EGO sensor output signal to the electronic engine controller can become short-circuited or open-circuited, resulting in an overvoltage or undervoltage EGO sensor signal. In addition, air leaks in the vehicle exhaust system can cause an EGO sensor to generate a faulty signal. Also, a phenomenon known as characteristic shift downward (CSD) can occur. A common cause of CSD is contaminants which enter the atmospheric oxygen port of an EGO sensor and reduce the exposure of the reference electrode to atmospheric oxygen. When such contamination occurs, the voltage of the EGO sensor output signal shirts downward. For example, instead of the EGO sensor operating between approximately zero and one volt, the EGO sensor output signal may shift downward and instead operate between approximately −1 and zero volts.

When a fault in an EGO sensor output signal occurs, it is important to detect that fault so the vehicle's owner can be notified by the electronic engine controller to bring the vehicle into a dealership for repair. However, it is also advantageous to be able to distinguish between the various causes of EGO sensor output signal faults. Different causes may require different actions by a repair technician (for example, fixing a shorted wire, fixing an air leak in the vehicle's exhaust system, or replacing the EGO sensor).

As mentioned above, an EGO sensor output signal is typically read by an electronic engine controller. Typical "front-end" circuitry into which each EGO sensor signal is routed in the electronic engine controller includes an operational amplifier. Such an operational amplifier's two power supply inputs are typically connected to a positive voltage power supply and to ground. The operational amplifier is typically configured in a "unity-gain" configuration such that the EGO sensor output signal is buffered by the operational amplifier but otherwise generally not changed. In such a unity-gain configuration, the EGO sensor output signal is routed into the non-inverting input of the operational amplifier. The output of the operational amplifier is then routed in some form to a microprocessor within the electronic engine controller. In general, the use of an operational amplifier in the front end of the electronic engine controller as described here is very economical in is thus desirable to use an operational amplifier for this application.

However, due to the use of an operational amplifier, a problem can occur when an EGO sensor experiences a CSD fault. This is due to a characteristic of a typical operational amplifier when connected to a positive voltage supply and to ground. As mentioned above, when an EGO sensor output signal experiences CSD, its voltage tends to shift negative. When a negative voltage of any more titan a small fraction of a volt is input into a typical operational amplifier connected to a positive voltage supply and to ground, the operational amplifier outputs a relatively large positive voltage. This positive voltage tends to approach the voltage of the positive voltage supply to the operational amplifier. This large positive voltage output from the operational amplifier is similar to the output which would occur if the EGO sensor output signal went into an overvoltage fault condition. Because the output from the operational amplifier is approximately the same when the EGO sensor experiences CSD as when the EGO sensor experiences an overvoltage fault, the electronic engine controller cannot typically tell the difference between the two conditions.

Because the electronic engine controller cannot generally tell the difference between a CSD fault and an overvoltage fault, a service technician working on the vehicle and interrogating the electronic engine controller's diagnostic memory has little or no guidance as to which condition occurred. As a result, the service technician may perform an incorrect or unnecessary repair procedure.

Therefore, means to detect CSD and to thereby distinguish it from other EGO sensor signal faults, while still employing an economical operational amplifier front end, will provide a great advantage over the prior art.

SUMMARY OF THE INVENTION

The present invention provides a method for detecting a fault in an exhaust gas oxygen (EGO) sensor in the nature of a characteristic shift downward (CSD) fault. The method comprises, first, the step of generating a first signal. This first signal has a first voltage if the EGO sensor signal voltage is below a first threshold but above a second threshold. However, if the EGO sensor signal voltage is below the second threshold, the first signal instead has a second voltage. The method further comprises the step of measuring the voltage of the first signal a first time. The method also comprises setting a flag to indicate a possible EGO sensor fault if the measured voltage is substantially equal to the first voltage. In addition, the method comprises measuring the first signal a subsequent time. Finally, the method comprises the step setting a flag to indicate an EGO sensor fault if the subsequently measured voltage is near the second voltage and if the flag which indicates a possible EGO sensor fault is set.

The method provided by this invention solves the problem of distinguishing CSD from other EGO sensor faults. The flag to indicate CSD is set only if the flag which indicates possible CSD is already set. Therefore, other faults which can appear similar to a CSD fault will not set the flag which indicates a CSD fault.

The present invention further provides an apparatus for detecting an EGO sensor fault in the nature of a CSD fault. The apparatus comprises first, means for generating a first signal which has a first voltage if the EGO sensor signal voltage is below a first threshold but above a second threshold and a second voltage if the EGO sensor signal is below the second threshold. The apparatus further comprises means for measuring the voltage of the first signal a first time. In addition, the apparatus comprises first flag means for flagging a potential EGO sensor fault. Also, the apparatus comprises means for setting the first flag means if the measured voltage is substantially equal to the first voltage. The apparatus further comprises means for measuring the voltage of the first signal a subsequent time. Also, the apparatus comprises second flag means for flagging an EGO sensor fault. Finally, the apparatus comprises means for setting a flag to indicate an EGO sensor fault if the subsequently measured voltage is near the second voltage and if the flag which indicates a possible EGO sensor fault is set.

BRIEF DESCRIPTION OF THE DRAWINGS

FIG. 3 is a plot of an exhaust gas oxygen sensor signal showing both a normal output signal and an output signal which is generated during a characteristic shift downward fault.

DETAILED DESCRIPTION OF THE PREFERRED EMBODIMENT

Figure 1:
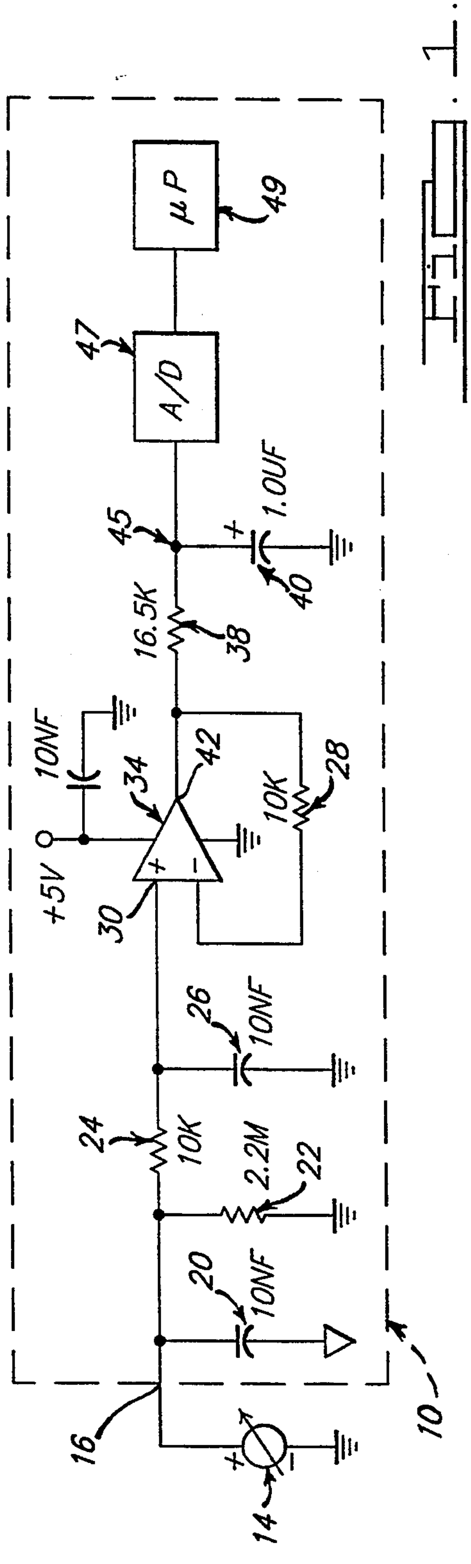
FIG. 1 is an electrical schematic of the apparatus of the present invention.

Referring to FIG. 1, an EGO sensor 14 is connected to the input 16 of an electronic engine controller 10 such as a Ford EEC-V electronic engine controller. Additional EGO sensors can also be connected to similar inputs of electronic engine controller 10. A capacitor 20 located near input 16 filters out noise. A resistor 22 provides an electrical load for EGO sensor 14. Resistor 24 and capacitor 26 operate as a low-pass filter to further filter out noise from the EGO sensor signal. Neither capacitor 20 nor the filter formed by the combination of resistor 24 and capacitor 26 significantly alter the output signal from EGO sensor 14. They merely filter out electrical noise of a higher frequency than the frequency content generally in the output signal from EGO sensor 14. Operational amplifier 34, such as a LM124 from National Semiconductor Corporation, is connected in a unity-gain configuration. After the low-pass filter formed by resistor 24 and capacitor 26, the EGO sensor signal is fed into non-inverting input 30 of operational amplifier 34.

Figure 2:
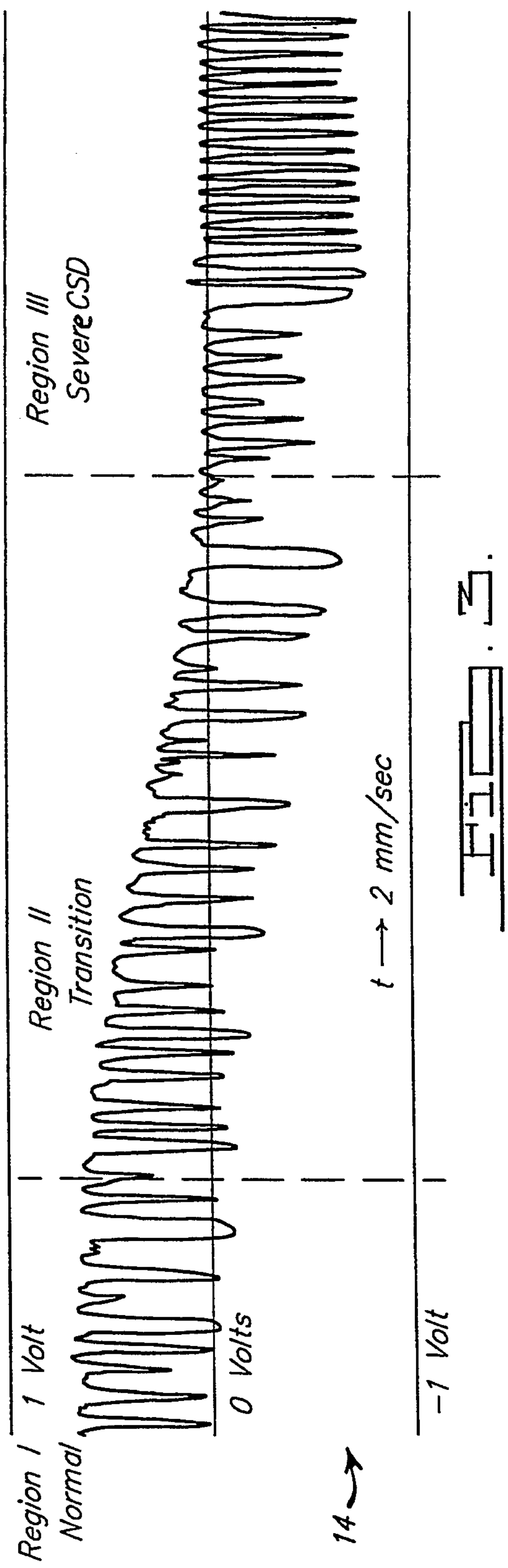
FIG. 2 is an input-output plot for the operational amplifier shown in FIG. 1.
Figure 2:
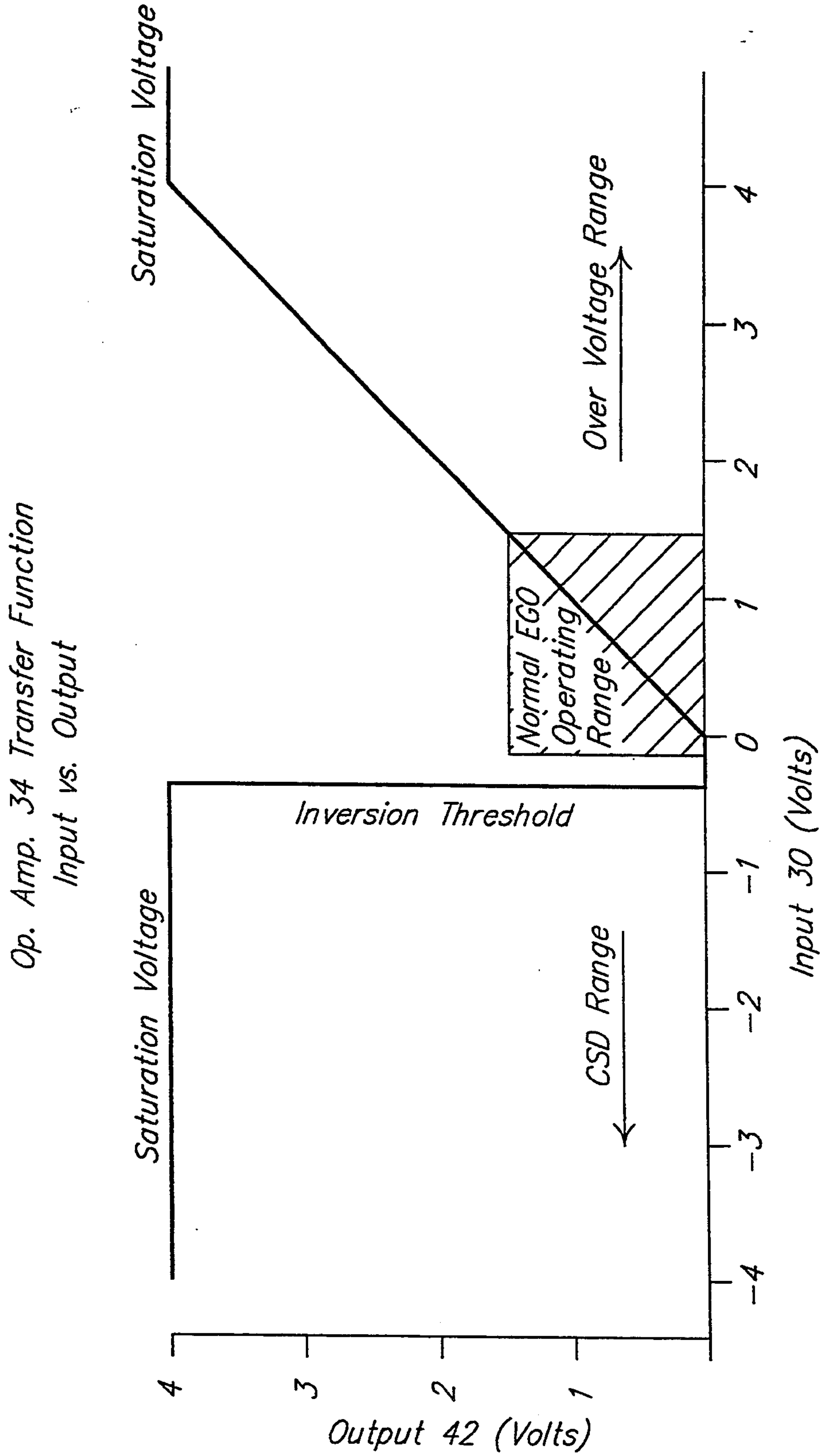

The voltage at output 42 of operational amplifier 34 as a function of the voltage at input 30 is shown in FIG. 2. Owing to the fact that operational amplifier 34 is connected in a unity-gain configuration, the voltage at output 42 is essentially equal to the voltage at input 30 for a range of voltage at input 30 from about zero to about 4 volts. Above an input 30 of about 4 volts, operational amplifier 34 saturates and generates about 4 volts (the "saturation voltage" or "maximum output voltage" of operational amplifier 34 of the preferred embodiment) at output 42. For input 30 of from about zero to about −0.3 volts, operational amplifier 34 generates a voltage of about zero volts at output 42. For an input 30 of less than about −0.3 volts (the "inversion threshold voltage" of operational amplifier 34 of the preferred embodiment), output 42 of operational amplifier 34 saturates at a voltage shown in FIG. 2 to be about 4 volts.

A typical output signal from EGO sensor 14 is shown in FIG. 3. During normal operation of EGO sensor 14, designated as Region I in FIG. 3, the voltage of the output signal from EGO sensor 14 is bounded approximately by zero volts and approximately one volt. The signal is near the upper end of its range when there is a lack of oxygen in the vehicle exhaust gas, indicating a rich intake air-fuel ratio condition. The signal is near the lower end of its range when there is a relative abundance of oxygen in the exhaust gas, indicating a lean intake air-fuel ratio condition. During a characteristic shift downward fault, designated as Region III in FIG. 3, the voltage of the output signal from EGO sensor 14 has shifted downward. In the illustration in FIG. 3, the voltage of the EGO sensor output signal is approximately bounded by −1 volt and zero volts. Between Regions I and III in FIG. 3, a transition Region II typically exists. In this region, the output signal from EGO sensor 14 shifts from normal operation in Region I to the characteristic shift downward condition of Region III.

Referring again to FIG. 1, as long as the output signal from EGO sensor 14 remains above about zero volts and below about 4 volts, output 42 of operational amplifier 34 will be essentially the same as the output signal from EGO sensor 14. If the output signal from EGO sensor 14 drops below about zero volts, output 42 of operational amplifier 34 will go to about zero volts, in accordance with FIG. 2. Furthermore, if the output signal from EGO sensor 14 drops below about −0.3 volts, output 42 of operational amplifier 34 will go to approximately 4 volts, also in accordance with FIG. 2.

It should be noted that once output 42 of operational amplifier 34 has gone to approximately 4 volts due to the output signal from EGO sensor 14 going below about −0.3 volts, the 4 volt signal will be interpreted by electronic engine controller 10 as a rich air-fuel condition. Electronic engine controller 10 will therefore try to increase the air-to-fuel ratio. This action will further drive the output from EGO sensor 14 negative, because the output signal from EGO sensor 14 tends toward its lower value when the engine is running at a lean air-fuel ratio. The output signal from EGO sensor 14 continuing to be below −0.3 volts will further perpetuate the high output from operational amplifier 34. Therefore, once characteristic shift downward has caused the output signal from EGO sensor 14 to dip below −0.3 volts, output 42 from operational amplifier 34 will tend to remain at approximately 4 volts.

Continuing with reference to FIG. 1, output 42 of operational amplifier 34 is filtered by a low-pass filter formed by resistor 38 and capacitor 40. This filter is used only to reject noise and does not significantly alter the signal coming from output 42. After the signal has gone through the filter, emerging at node 45, the signal is routed to an analog-to-digital converter 47. Analog-to-digital converter 47 converts the signal at node 45 into digital form. The signal is thus accessible by a microprocessor 49 such as an Intel 8065 microprocessor One skilled in the art will recognize that such a microprocessor 49 has a number of capabilities. One such capability is the ability to set and clear flags in memory based on various conditions. (That memory can be either memory within microprocessor 49 or in a separate integrated circuit connected to microprocessor 49, or both.) Another such capability is the ability to increment and decrement the contents of locations in memory. Such incrementing and decrementing ability allows microprocessor 49 to maintain various "timers" by incrementing and decrementing memory locations on a periodic basis. One skilled in the art will also recognize that microprocessor 49 can measure the voltage at node 45, because that voltage has been converted to digital form by analog-to-digital converter 47. Further, one skilled in the art will recognize that microprocessor 49 can, in software, operate "filter" algorithms which can be used as means to create delays prior to microprocessor 49 performing a particular function.

Figure 4:
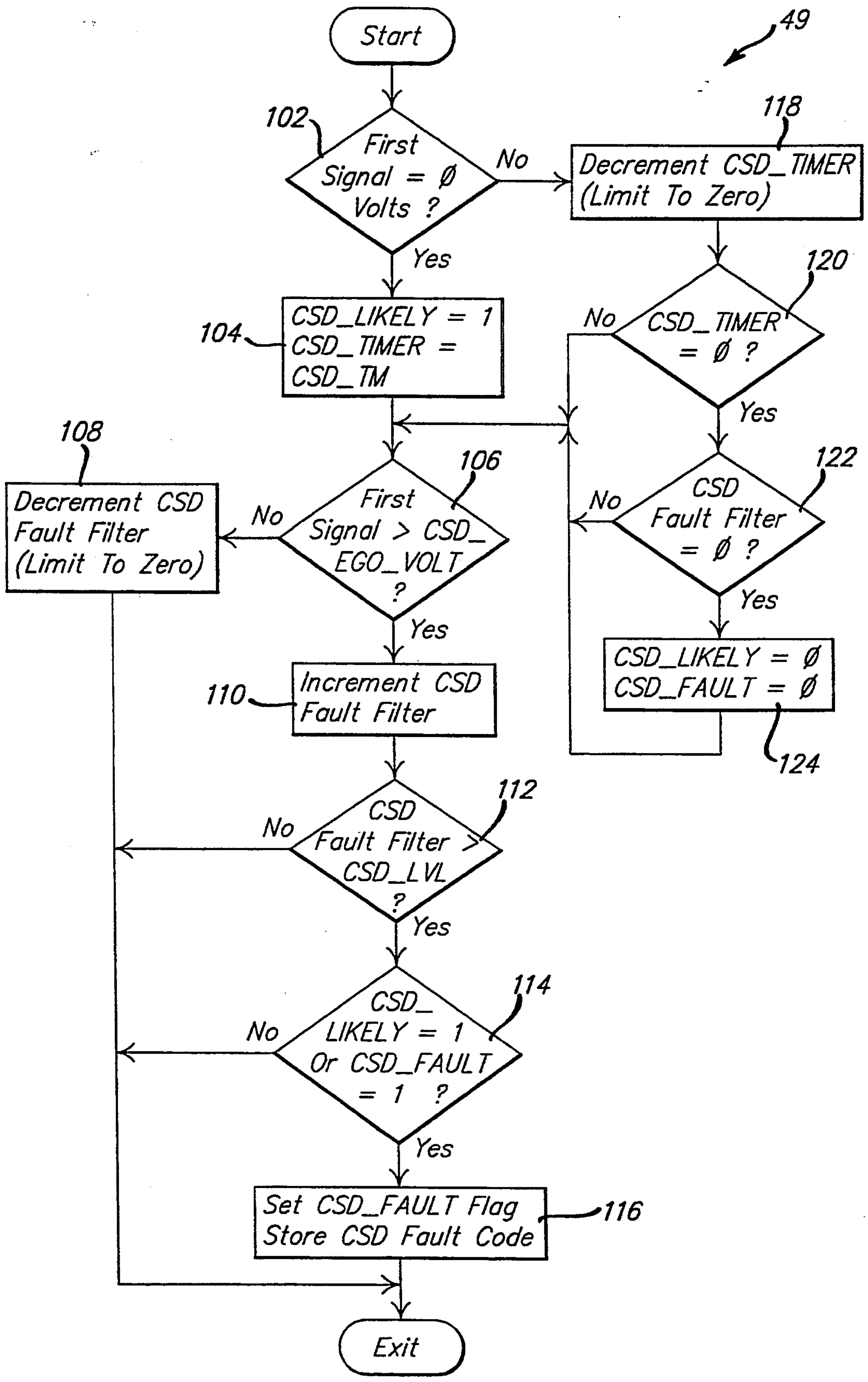
FIG. 4 is a flowchart illustrating the logic performed by the microprocessor in FIG. 1.

FIG. 4 illustrates logic executed by microprocessor 49. The logic is preferably performed every 20 to 50 milliseconds. At step 102, the voltage at node 45, as converted to digital form by analog-to-digital converter 47 (FIG. 1), is examined (that is, measured). If the voltage is zero, that is due to the output signal from EGO sensor 14 being between 0 and −0.3 volts, in accordance with FIG. 2. In that case, the logic moves to step 104. At step 104, a flag CSD_LIKELY in memory is set in recognition of the fact that the output signal from EGO sensor 14 is close to its lower limit of normal voltage. An impending characteristic shift downward fault is thus recognized. Preferably, the CSD_LIKELY flag is located in "non-volatile" memory, memory which is retained even if the vehicle's ignition is switched off. At step 104, a software timer CSD_TIMER is also initialized, to a small value CSD_TM, preferably about two seconds. At step 106, the voltage at node 45 is again examined (that is, measured). If the voltage is greater than a threshold CSD_EGO_VOLT, typically 3.5 volts, there is a recognition that the EGO sensor output signal is out of range. (Recall from FIG. 2, however, that a voltage above 3.5 volts at node 45 can be due either to an overvoltage at input 30 or a voltage below about −0.3 volts at input 30. The exact cause for the voltage at node 45 being above the threshold CSD_EGO_VOLT is therefore not yet known).

If the voltage is greater than threshold CSD_EGO_VOLT, the value contained within a CSD fault filter is increased at step 110. The CSD fault filter is preferably a first-order low-pass digital filter implemented in software in microprocessor 49. The filter preferably has a time constant of about 5 seconds. The value contained within the filter is increased by exposing the filter to a step-function input. After the value contained within the CSD fault filter is increased, the logic proceeds to step 112. Here, the value within the CSD fault filter is examined to determine whether the value is greater than a threshold CSD_LVL, preferably 63% of the filter's fully-incremented value. (Those skilled in the art will recognize that a first-order filter exposed to a step-function input will reach approximately 63% of its final value within a time period equal to the time constant of the filter). If the value within the filter is greater than CSD_LVL, it is recognized that the output signal from EGO sensor 14 has been out of range for a considerable amount of time, and being out of range is therefore not merely a momentary aberration. Those skilled in the art will thus recognize that the filter is a delay means to prevent the logic performed by microprocessor 49 from reacting too quickly to a voltage above threshold CSD_EGO_VOLT.

The test then proceeds to step 114. At step 114, the CSD_LIKELY flag is tested. If the CSD_LIKELY flag is set, there is a recognition that the output from EGO sensor 14 is out of range due to CSD, as opposed to other causes such as overvoltage of the output signal from EGO sensor 14. A CSD_FAULT flag in memory is therefore set at step 116 to signal that a CSD fault currently exists. Preferably, the CSD_FAULT flag is located in non-volatile memory. Additionally, a CSD fault code is stored in memory. This is the same area of memory where electronic engine controller 10 stores other fault codes, also preferably non-volatile memory. Further at step 114, if the CSD_FAULT flag was already set, it will remain set at step 116. The logic is then exited.

Further regarding step 106, if the voltage at node 45 (FIG. 1) is not greater than threshold CSD_EGO_VOLT, the logic proceeds to step 108. At step 108, the value within the CSD fault filter is decreased in recognition that the output signal from EGO sensor 14 is not out of range. The value contained within the CSD fault filter is decreased by exposing the filter to a zero input and employing the same time constant as that used by the filter in step 110. The logic is then exited.

Further regarding step 102, if the voltage at node 45 (FIG. 1) is not equal to zero volts, there is a recognition that the output signal from EGO sensor 14 is not between zero and −0.3 volts. This being the case, the logic branches to step 118, where the process of clearing the CSD_LIKELY and CSD_FAULT flags is begun. At step 118, the timer CSD_TIMER is decremented. Step 120 then tests to determine whether the timer CSD_TIMER has expired (that is, whether the timer CSD_TIMER has reached zero). If it has not, not enough time has elapsed since the output signal from EGO sensor 14 was in the range of 0 to −0.3 volts to reset the CSD_LIKELY and CSD_FAULT flags. The test therefore moves to step 106 without resetting the CSD_LIKELY and CSD_FAULT flags.

If the timer CSD_TIMER has expired, the logic moves to step 122, where the contents of the CSD fault filter are examined. If the CSD fault filter contains a value greater than zero, it is recognized that the output signal from EGO sensor 14 has recently been out of range. Under that circumstance, the CSD_LIKELY flag and the CSD_FAULT flag are not reset and the test proceeds to step 106. If the CSD fault filter contains a value of zero, it is recognized that the a CSD fault is not present or likely. Step 124 is then executed, clearing the CSD_LIKELY flag and the CSD_FAULT flag. The logic then proceeds to step 106.

This invention solves the problem of distinguishing a CSD fault from other faults. An out-of-range output signal from EGO sensor 14 will be flagged as a CSD fault only if there was a previous recognition that a CSD fault was likely. As a result, electronic engine controller 10 will be able to recognize the difference between a CSD fault and other EGO sensor faults which generate a similar overvoltage at output 42 of operational amplifier 34.

Various modifications and variations will no doubt occur to those skilled in the arts to which this invention pertains. Such variations which generally rely on the teachings through which this disclosure has advanced the art are properly considered within the scope of this invention. For example, the CSD fault filter can be replaced by other delay means, such as a software timer, for delaying the setting of the CSD_FAULT flag.

What is claimed is:

1. A method for detecting a fault in an exhaust gas oxygen (EGO) sensor of an engine, said EGO sensor being a device which generates an output signal which has a normal output voltage range with an upper boundary and a lower boundary, said method comprising the steps of:

generating a first signal substantially equal to a voltage V1 if the EGO sensor output signal has a voltage below a first threshold VT1 but above a second threshold VT2; generating a first signal substantially equal to a voltage V2 if the EGO sensor output signal has a voltage below the second threshold VT2;

performing a first measurement of the voltage of said first signal;

setting a first flag if said first voltage measurement is substantially equal to voltage V1, said first flag indicating a possible EGO sensor fault;

performing a subsequent measurement of the voltage of said first signal; and setting a second flag indicating an EGO sensor fault if said subsequent voltage measurement is greater than a threshold voltage VT3, said threshold voltage VT3 being less than voltage V2, and if said first flag is set.

2. The method recited in claim 1 further comprising employing a delay after said subsequent voltage measurement and prior to setting said second flag.

3. The method recited in claim 2 wherein said threshold VT1 is near the lower boundary of the normal output voltage range for said EGO sensor and VT2 is below both VT1 and the lower boundary of the normal output voltage range for said EGO sensor.

4. The method recited in claim 3 wherein said first signal is substantially proportional to said EGO sensor output signal if the EGO sensor output signal has a voltage greater than said first threshold VT1.

5. A test method for detecting a fault in an exhaust gas oxygen (EGO) sensor, said EGO sensor being a device which generates an output signal which has a normal output voltage range with an upper boundary and a lower boundary, said test method comprising the steps of:

beginning the test method;

providing a flag CSD_FAULT to flag EGO sensor faults and a CSD fault filter to delay the setting of said flag;

generating a first signal substantially equal to a voltage V1 if the EGO sensor output signal has a voltage below a threshold VT1 but above a threshold VT2; generating a first signal substantially equal to a voltage V2 if the EGO sensor output signal has a voltage below threshold VT2;

performing a first measurement of the voltage of said first signal;

if said first voltage measurement is substantially equal to voltage V1, setting a CSD_LIKELY flag and initializing a timer CSD_TIMER to a pre-determined period of time CSD_TM; if said first voltage measurement is not substantially equal to voltage V1, decrementing the timer CSD_TIMER and resetting the CSD_LIKELY flag if the decremented timer CSD_TIMER is zero, the CSD_FAULT flag is zero, and the CSD fault filter is zero;

performing a subsequent measurement of the voltage of said first signal;

incrementing the CSD fault filter if said subsequent voltage measurement is greater than a threshold VT3; decrementing the CSD fault filter and exiting the test if said subsequent voltage measurement is not greater than the threshold VT3;

comparing to determine whether the CSD fault filter is greater than a pre-determined value T1; if yes, setting a CSD_FAULT flag if either the CSD_LIKELY flag is set or the CSD_FAULT flag is set and returning to the beginning of the test method; if no, returning to the beginning of the test method.

6. The method recited in claim 5 wherein said threshold VT1 is near the lower boundary of the normal output voltage range for said EGO sensor and VT2 is below both VT1 and the lower boundary of the normal output voltage range for said EGO sensor.

7. The method recited in claim 6 wherein said first signal is substantially proportional to said EGO sensor output signal if the EGO sensor output signal has a voltage greater than said first threshold VT1.

8. The method recited in claim 7 wherein said threshold VT1 is approximately 0.0 volts.

9. The method recited in claim 8 wherein said threshold VT2 is approximately −0.3 volts.

10. An apparatus for detecting a fault in an exhaust gas oxygen (EGO) sensor of an engine, said EGO sensor being a device which generates an output signal which has a normal output voltage range with an upper boundary and a lower boundary, said apparatus comprising:

means for generating a first signal substantially equal to a voltage V1 if the EGO sensor output signal has a voltage below a first threshold VT1 but above a second threshold VT2, and generating a first signal substantially equal to a voltage V2 if the EGO sensor output signal has a voltage below the second threshold VT2;

means for performing a first measurement of the voltage of said first signal;

first flag means for flagging a potential EGO sensor fault;

means for setting said first flag means if said first voltage measurement is substantially equal to voltage V1;

means for performing a subsequent measurement of the voltage of said first signal;

second flag means for flagging an EGO sensor fault; and means for setting said second flag means if said subsequent voltage measurement is greater than a threshold voltage VT3, said threshold voltage being less than voltage V2, and if said first flag is set.

11. The apparatus recited in claim 10 further comprising delay means for delaying the setting of said second flag.

12. The apparatus recited in claim 11 wherein said threshold VTI is near the lower boundary of the normal output voltage range for said EGO sensor and VT2 is below both VT1 and the lower boundary of the normal output voltage range for said EGO sensor.

13. The apparatus recited in claim 12 wherein said first signal is substantially proportional to said EGO sensor output signal if the EGO sensor output signal has a voltage greater than said first threshold VT1.

14. The apparatus of claim 13 wherein said means for generating a first signal comprises an operational amplifier.

15. An apparatus for detecting a fault in an exhaust gas oxygen (EGO) sensor, said EGO sensor being a device which generates an output signal which has a normal output voltage range with an upper boundary and a lower boundary, said apparatus comprising:

means for beginning a fault detection test;

means for generating a first signal substantially equal to a voltage V1 if the EGO sensor output signal has a voltage below a threshold VT1 but above a threshold VT2;

means for generating a first signal substantially equal to a voltage V2 if the filtered EGO sensor output signal has a voltage below threshold VT2;

means for performing a first measurement of the voltage of said first signal;

first flag means for indicating a potential EGO sensor fault;

timer means for measuring a time interval;

means for setting said first flag means and initializing said timer means to a pre-determined period of time if said first voltage measurement is substantially equal to voltage V1;

means for decrementing said timer means if said first voltage measurement is not substantially equal to voltage V1;

means for resetting the CSD_LIKELY flag if the decremented timer CSD_TIMER is zero, the CSD_FAULT flag is zero, and the CSD fault filter is zero;

second flag means for indicating an EGO sensor fault;

delay means for delaying the setting of said second flag means, said delay means containing a value capable of being increased and decreased;

means for performing a second measurement of the voltage of said first signal; means for increasing the value contained in said delay means if said second voltage measurement is above a threshold VT3;

means for decreasing the value contained in said delay means and returning to the beginning of the fault detection test if said second voltage measurement is not above said threshold VT3;

comparison means for comparing whether said delay means has accumulated a value greater than a predetermined value T1; testing means for testing whether said first flag means is set; testing means for testing whether said second flag means is set; and means for setting said second flag means if said delay means have accumulated a value greater than T1 and if either said first flag means is set or said second flag means is set.

16. The apparatus recited in claim 15 wherein said threshold VT1 is near the lower boundary of the normal output voltage range for said EGO sensor and VT2 is below both VT1 and the lower boundary of the normal output voltage range for said EGO sensor.

17. The apparatus recited in claim 16 wherein said first signal is substantially proportional to said EGO sensor output signal if the EGO sensor output signal has a voltage greater than said first threshold VT1.

18. The apparatus recited in claim 17 wherein said means for generating a first signal comprise an operational amplifier.

19. The apparatus recited in claim 18 wherein said threshold VT1 is approximately 0.0 volts.

20. The apparatus recited in claim 19 wherein said threshold VT2 is approximately −0.3 volts.

* * * * *